(No Model.) 3 Sheets—Sheet 1.

J. F. EMMERT.
BENCH VISE.

No. 457,710. Patented Aug. 11, 1891.

WITNESSES:
Fred G. Dieterich
Jos. A. Ryan

INVENTOR:
Joseph F. Emmert.
BY Munn & Co
ATTORNEYS (No Model.) 3 Sheets—Sheet 2.
J. F. EMMERT.
BENCH VISE.
No. 457,710. Patented Aug. 11, 1891.
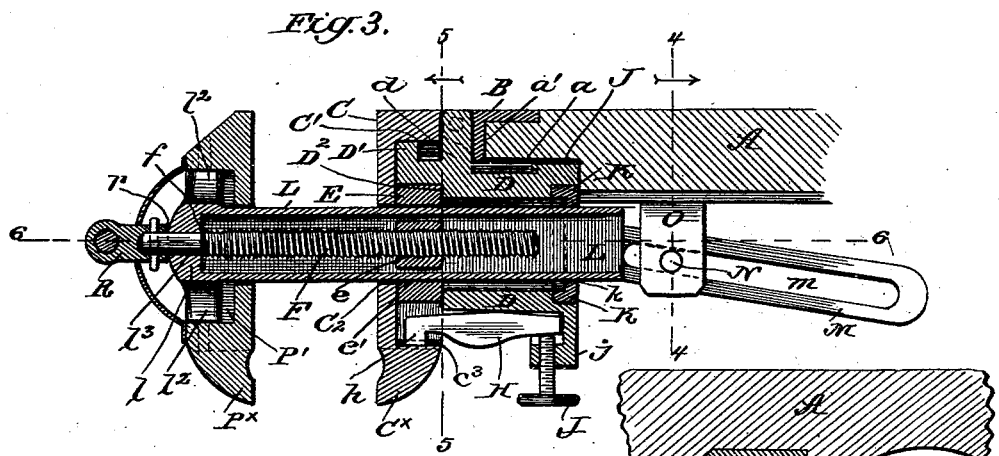
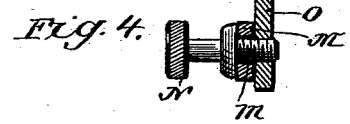
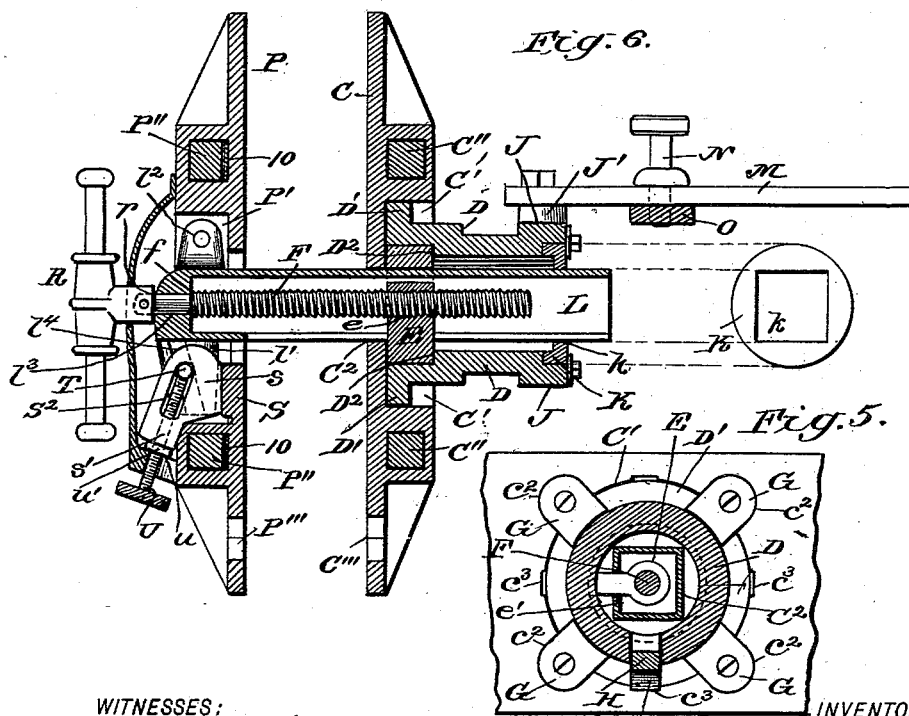
WITNESSES:
Fred G. Dieterich
Jos. A. Ryan
INVENTOR:
Joseph F. Emmert.
BY Munn & Co
ATTORNEYS (No Model.) 3 Sheets—Sheet 3.
J. F. EMMERT.
BENCH VISE.
No. 457,710. Patented Aug. 11, 1891.
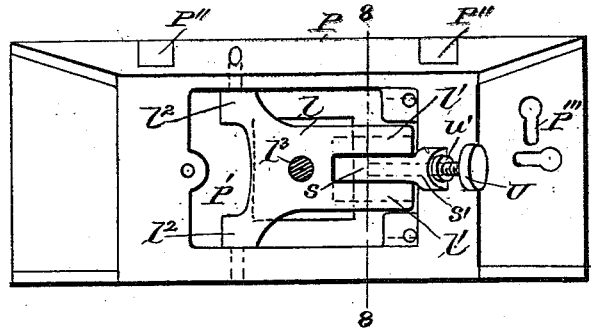
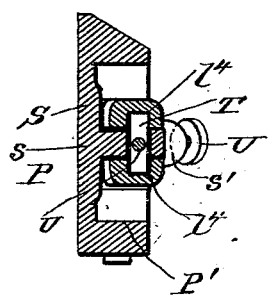 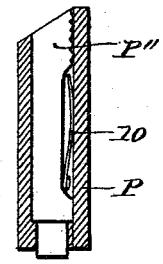
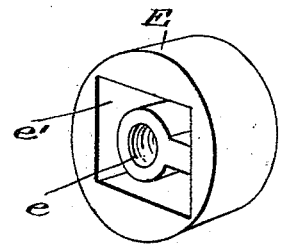
WITNESSES:
Fred G. Dieterich
Jos. A. Ryan
INVENTOR:
Joseph F. Emmert.
BY Munn & Co
ATTORNEYS

UNITED STATES PATENT OFFICE.

JOSEPH F. EMMERT, OF WAYNESBOROUGH, PENNSYLVANIA.

BENCH-VISE.

SPECIFICATION forming part of Letters Patent No. 457,710, dated August 11, 1891.

Application filed March 16, 1891. Serial No. 385,156. (No model.)

*To all whom it may concern:*

Be it known that I, JOSEPH F. EMMERT, residing at Waynesborough, in the county of Franklin and State of Pennsylvania, have invented certain new and useful Improvements in Bench-Vises, of which the following is a specification.

My invention, which relates more particularly to carpenter's bench-vises, has for its object to provide a vise which can be arranged for substantially universal adjustments, whereby the same will possess many advantages over those now in general use.

It also has for its object to provide a vise of this character which will be simple, effective, and easy to manipulate; and to these ends my invention consists in the novel arrangement and peculiar combination of the several parts, all of which will be hereinafter fully described in the annexed specification, and particularly pointed out in the claims, reference being had to the accompanying drawings, in which—

Figure 1:
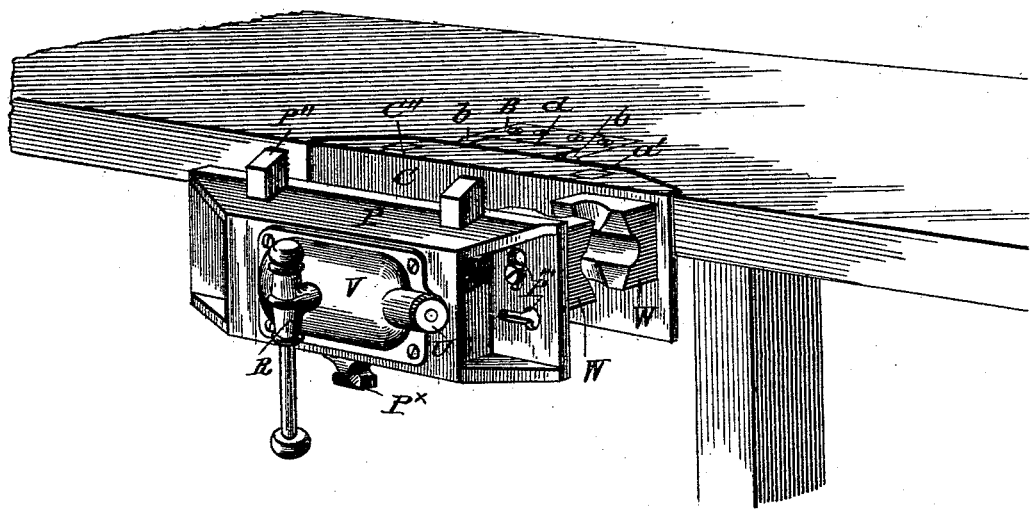
Figure 2:
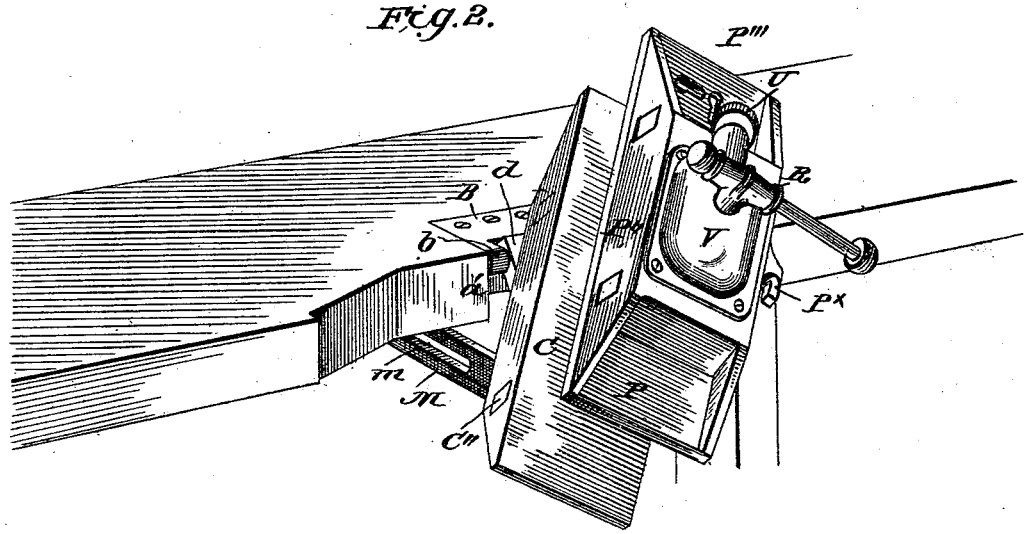

Figure 1 is a perspective view of my improved bench-vise with the jaws disposed in their ordinary position. Fig. 2 is a similar view showing the jaws adjusted diagonally and at an inclined plane to the bench. Fig. 3 is a vertical longitudinal section taken on the line 3 3, Fig. 1. Fig. 4 is a transverse section taken on the line 4 4, Fig. 3, looking in the direction indicated by the arrow. Fig. 5 is a transverse section on line 5 5, Fig. 3. Fig. 6 is a horizontal section on the line 6 6, Fig. 3. Fig. 7 is a detail view of the jaws hereinafter referred to; Fig. 8, a cross-section on line 8 8, Fig. 7; and Figs. 9 and 10 detail views, hereinafter specifically referred to.

In the accompanying drawings, A indicates the bench, the under surface of which is formed with a socket $a$, the front end of which is formed into a recess $a'$, in which is secured a casting B, having ears $b\ b$, in which is hinged the inner or stationary clamping-jaw C in the manner clearly shown in Fig. 3 of the drawings, by reference to which it will be seen that the said jaw is screwed to a sleeve D to turn thereon, said sleeve being formed with an extension $d$, which is hinged to the ears $b\ b$, the said sleeve D being also provided with an annular flange D', which fits in a socket C', formed in the rear face of the jaw C, which is formed with a central squared opening $C^2$, as shown. The forward end of the sleeve D is also formed with a socket $D^2$, in which seats to turn therein a metal bushing E, having an internally screw-threaded hub $e$, in which the feed-screw F operates in a manner presently described.

To hold the jaw C to the sleeve D and yet admit of its turning thereon, I provide a number of buttons G, fitted and screwed in sockets $c^2\ c^2$ in the jaws C, their inner ends projecting over the flange D', as shown, and to hold the said jaw C to any of its adjusted positions about the sleeve D', I form the inner annular face of the socket C' with a series of notches or depressions $c^3$, with which a locking-finger H is made to engage, such finger being held and centrally fulcrumed in a radial socket formed in the outer face of the sleeve D, the forward end of said finger being formed with a lug $h$, which normally fits flush with the annular flange $D^2$, and it can be made to project beyond it by means of the set-screw I, working in a boss $j$, formed on an annular flange J, formed on the rear end of the sleeve, such flange also serving to hold in place a disk K, formed with a squared aperture $k$, which aligns the squared aperture in the jaw C, such apertures serving to form the guide for the feed-screw sleeve or box L, presently described.

The flange J is formed with a lateral stud J', to which is pivotally connected the outer end of a link M, the inner portion of which is formed with an elongated slot $m$, through which passes a set-screw N, held in a bracket O, secured upon the under side of the bench, as shown. By this construction it will be seen that the jaw C can be tilted and adjusted at any angle from a vertical to a horizontal position and can be held locked in its adjusted position by simply tightening the screw N.

P indicates the outside or movable jaw, which is formed with a central aperture, which communicates with a socketed portion P' in its outer face, said jaw having a hinged connection with the screw-sleeve L, such connection being most clearly illustrated in Fig. 7 of the drawings, by reference to which it will be seen that the inner end of such sleeve is formed with an angled extension *l*, having forked members *l' l'* and ears *l² l²*, pivoted to the side walls of the socket P'. The sleeve L is held in a fixed position by being passed through the central aperture in the jaw C, through a squared opening *e'* in the boss E, and through the squared opening in the disk K, in a manner clearly shown in Fig 3, the screw F operating in the screw-threaded part *e* of the boss, its outer end passing through an aperture *l³* in the member *l* of the sleeve, and held for rotation therein by means of its shoulder *f* and the shoulder *r* of the slip handle socket R, as shown.

It will be observed by reference to Fig. 4 that the central aperture in the jaw P is elongated and of a size larger than the sleeve L, such construction being for the purpose of admitting the said jaw to be set at an angle to its mate, and also to allow the said sleeve sufficient room to be put in its position, whereby such jaws can be quickly adapted for clasping wedge-shaped articles; and to provide a simple and effective means for quickly adjusting the outer jaw for such purposes I employ the means most clearly shown in Figs. 6, 7, and 10 of the drawings, in which S indicates a bracket or ear cast integral with the jaw P and formed with an angular member *s*, which extends up between the forked members *l' l'* of the sleeve, the outer end of said bracket extending beyond the back face of the jaw P and formed with an apertured hub S', such hub being arranged diagonally to the axis of the screw F, as shown. The inner faces of the forked members *l' l'* are formed with parallel grooves *l⁴ l⁴*, which are arranged diagonally to the feed-screw F, and in such grooves operates a screw-nut or follower T, said follower passing through a diagonally-arranged slot S² in the bracket S.

U indicates a feed-screw having a milled head, which extends to the rear of the jaw P, and is held to turn in the apertured hub S' and from longitudinal movements therein by means of the collars *u u'*, said screw fitting the follower T.

V indicates a cap-plate which fits over the rear wall of the jaw P and forms a housing for the inner end of the sleeve L and the feed-screw U and their adjuncts.

By means of the aforesaid construction it will be readily understood that the sleeve L, being held to the inside jaw and sleeve D, in the manner described, and such sleeve L supporting the outer jaw P', as stated, both jaws can be quickly swung up at an angle to the bench, and by supporting the sleeve L in the housing E and disk K, which are loosely held in the sleeve D, and supporting the jaw C thereon, as stated, both jaws can be turned upon said sleeve to any position desired, and held in such position by the screw I, as before stated. The jaws C and P are each formed with a supplemental jaw C× and P× and sliding holding-dogs C'' and P'', held in any of their adjusted positions by means of the leaf-springs 10 10, as shown, and with keyhole slots C''' P''' to accommodate the detachable blocks W W, which are formed with curved faces to accommodate them for clamping wood-working attachments and the like.

From the foregoing description, taken in connection with the drawings, the advantages and operation of my improved vise will be readily understood, the same presenting many advantages over the ordinary vises, as the jaws can be quickly adjusted to any of the desired positions in a moment's time, as the hinged sleeve can be set to any angle desired or can be thrown up at right angles from its vertical to a horizontal position, in which position the jaws can be set to any point corresponding with the compass.

Having thus described my invention, what I claim, and desire to secure by Letters Patent, is—

1. A bench-vise consisting of the outer and inner clamping-jaws, the outer clamping-jaw supported by and longitudinally adjustable in the inner jaw, said jaws connected to the bench and arranged for universal adjustments relatively thereto, substantially as and for the purpose described.

2. In a bench-vise, the combination, with the bench and a sleeve hinged thereto and adapted to be swung up from a vertical to a horizontal position, of the inner jaw held to rotate on said sleeve, and the outer jaw having a bearing in said sleeve, said bearing adapted to be rotated and longitudinally adjustable in said sleeve, substantially as and for the purpose described.

3. In a bench-vise, the combination, with the inner or fixed jaw, of the outer jaw arranged to be adjusted to or from said inner jaw in parallel planes, and means for further adjusting the outer jaw at a tapering plane to the inner jaw, as and for the purpose described.

4. The combination, with the bench A, the sleeve D, hinged thereto, as shown, and means for holding the sleeve in its adjusted positions, of the inner jaw held to rotate on the sleeve, and the outer jaw formed with an extension held to rotate in the said sleeve, and means for holding the said jaws to their adjusted positions on the said sleeve, as and for the purposes stated.

5. The combination, with the bench A, of the sleeve D, hinged thereto, as shown, the devices for holding the sleeve in its adjusted positions, said sleeve formed with an annular flange, the inner jaw held to said flange, the locking-finger H, and the adjusting-screw I for holding said jaw in adjusted positions, and the outer jaw having a stem longitudinally adjustable in the sleeve and held to rotate therein, substantially as and for the purpose described.

6. In a bench-vise, the combination, with the table, the hinged sleeve D, the boss E, having a threaded part *e*, and the disk K, said boss and disk held to turn in said sleeve and the inner jaw held to turn on said sleeve, of a sleeve L, held in the disk K and boss E, the jaw P, secured to the outer end of said sleeve, and the feed-screw F, fitted to turn in the sleeve L and operating in the threaded boss E, as and for the purposes described.

7. In a bench-vise, the combination, with the bench A, the sleeve D, hinged thereto, as shown, and provided with an apertured and threaded boss E and an apertured disk K, held in alignment with the boss E, and the centrally-apertured jaw C, held on the sleeve D, of the sleeve L, held in the disk K and boss E and formed with a lateral extension $l$ at its outer end, the centrally-apertured jaw P, having a hinged connection with said extension $l$, the feed-screw F, held to rotate in said sleeve L and operating in the threaded boss E, and means for adjusting the jaw P on the sleeve L diagonally to the axis of the screw F, as and for the purpose described.

8. The combination, with the bench A, sleeve D, and the jaw C, held thereon, of the sleeve L, held for longitudinal adjustment in the sleeve D, the feed-screw F, operating in the sleeve L, said sleeve L formed with a lateral extension having a forked end and guide-grooves formed in said forked end, arranged diagonally to the feed-screw axis, the centrally-apertured jaw P, having a hinged connection with the sleeve L, a bracket or ear S integral therewith, having a diagonally-disposed slotted member disposed in the forked end of the extension $l$, a feed-screw T, operating in said member, and a follower-nut on said screw operating in the said slotted member and the guide-grooves, all arranged substantially as and for the purpose described.

9. The combination, with the bench A, the sleeve D, hinged thereto, as shown, of the jaws C and P, supported on and adapted to be turned to any angle with the face of the bench, said jaws provided with spring-actuated holding-fingers vertically adjustable in the jaws, as and for the purpose described.

10. The combination, with the jaws C and P, arranged as described and provided with key-hole slots, as shown, of the detachable blocks W, adapted to be secured to said jaws, as and for the purpose described.

11. In a bench-vise, the hinge-plate B, having its pivot centers transversely with the bench-screw F, in the manner set forth.

JOSEPH F. EMMERT.

Witnesses:
F. S. BRENISHOLT,
ALFRED H. ROWE.